(12) United States Patent
O'Connor et al.

(10) Patent No.: US 10,189,568 B2
(45) Date of Patent: *Jan. 29, 2019

(54) AGRICULTURAL CROP ANALYSIS DRONE

(71) Applicant: Topcon Positioning Systems, Inc., Livermore, CA (US)

(72) Inventors: Raymond M. O'Connor, Pleasanton, CA (US); Ivan Giovanni Di Federico, Argenta (IT)

(73) Assignee: Topcon Positioning Systems, Inc., Livermore, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/658,968

(22) Filed: Jul. 25, 2017

(65) Prior Publication Data

US 2017/0334560 A1 Nov. 23, 2017

Related U.S. Application Data

(62) Division of application No. 14/802,389, filed on Jul. 17, 2015, now Pat. No. 9,745,060.

(51) Int. Cl.
| | |
|---|---|
| *B64C 39/02* | (2006.01) |
| *A01B 79/00* | (2006.01) |
| *G05D 1/10* | (2006.01) |
| *A01C 23/04* | (2006.01) |
| *G05D 1/00* | (2006.01) |

(52) U.S. Cl.
CPC .......... *B64C 39/024* (2013.01); *A01B 79/005* (2013.01); *A01C 23/047* (2013.01); *G05D 1/0088* (2013.01); *G05D 1/104* (2013.01); *B64C 2201/024* (2013.01); *B64C 2201/108* (2013.01); *B64C 2201/123* (2013.01); *B64C 2201/141* (2013.01)

(58) Field of Classification Search
USPC .......................................................... 701/3
See application file for complete search history.

(56) References Cited

U.S. PATENT DOCUMENTS

| 3,943,344 A | 3/1976 | Kidode |
| 5,008,821 A | 4/1991 | Pratt et al. |
| (Continued) | | |

FOREIGN PATENT DOCUMENTS

| CN | 103299975 A | 9/2013 |
| CN | 103723275 A | 4/2014 |
| (Continued) | | |

OTHER PUBLICATIONS

International Search Report and Written Opinion dated Feb. 9, 2017 in connection with International Application No. PCT/US2016/059626, 12 pages.

(Continued)

*Primary Examiner* — Tyler D Paige
(74) *Attorney, Agent, or Firm* — Chiesa Shahinian & Giantomasi PC (57) ABSTRACT

A method and system utilizing one or more agricultural drones in combination with agricultural equipment, e.g., an agricultural boom sprayer, to evaluate the crops being farmed, and to improve the real-time delivery and dispensing of liquid from the sprayer including monitoring and verifying that the liquid is being dispensed correctly and/or in accordance with a desired distribution pattern or level.

30 Claims, 7 Drawing Sheets

(56) References Cited

U.S. PATENT DOCUMENTS

| | | | |
|---|---|---|---|
| 5,375,663 A | 12/1994 | Teach | |
| 5,474,085 A | 12/1995 | Humik et al. | |
| 5,751,576 A | 5/1998 | Monson | |
| 5,974,348 A | 10/1999 | Rocks | |
| 6,032,084 A | 2/2000 | Anderson et al. | |
| 6,445,983 B1 | 9/2002 | Dickson et al. | |
| 6,529,615 B2 | 3/2003 | Hendrickson et al. | |
| 7,479,884 B1 | 1/2009 | Fullerton | |
| 7,689,434 B2 | 3/2010 | Cureton et al. | |
| 7,734,398 B2 | 6/2010 | Mannepalli | |
| 8,442,765 B1 | 5/2013 | Ingvalson | |
| 8,730,014 B2 | 5/2014 | Fullerton | |
| 9,037,521 B1 | 5/2015 | Mewes et al. | |
| 9,745,060 B2 * | 8/2017 | O'Connor | B64C 39/024 |
| 2004/0162638 A1 | 8/2004 | Solomon | |
| 2007/0208442 A1 | 9/2007 | Perrone | |
| 2009/0294573 A1 | 12/2009 | Wilson et al. | |
| 2009/0299496 A1 | 12/2009 | Cade | |
| 2010/0017046 A1 | 1/2010 | Cheung et al. | |
| 2012/0022712 A1 | 1/2012 | Matos | |
| 2012/0101861 A1 | 4/2012 | Lindores | |
| 2012/0109614 A1 | 5/2012 | Lindores | |
| 2012/0298021 A1 | 11/2012 | Phillips | |
| 2012/0310532 A1 * | 12/2012 | Snoeck | G06Q 10/06 701/482 |
| 2013/0173321 A1 | 7/2013 | Johnson | |
| 2013/0231968 A1 | 9/2013 | Willness | |
| 2014/0024313 A1 | 1/2014 | Campbell | |
| 2014/0035752 A1 | 2/2014 | Johnson | |
| 2014/0089045 A1 | 3/2014 | Johnson | |
| 2014/0095261 A1 | 4/2014 | Johnson | |
| 2014/0188573 A1 | 7/2014 | Avey et al. | |
| 2014/0222246 A1 | 8/2014 | Mohamadi | |
| 2014/0222374 A1 | 8/2014 | Lock et al. | |
| 2014/0303814 A1 * | 10/2014 | Burema | A01B 79/005 701/3 |
| 2014/0316614 A1 | 10/2014 | Newman | |
| 2015/0037307 A1 | 2/2015 | Bralkoski et al. | |
| 2015/0106434 A1 | 4/2015 | Fiene et al. | |
| 2016/0050840 A1 | 2/2016 | Sauder et al. | |
| 2016/0202227 A1 * | 7/2016 | Mathur | G06Q 50/02 702/2 |
| 2017/0015416 A1 * | 1/2017 | O'Connor | B64C 39/024 |
| 2017/0127606 A1 * | 5/2017 | Horton | A01C 5/06 |
| 2017/0161584 A1 * | 6/2017 | Guan | G06K 9/4652 |
| 2017/0334560 A1 * | 11/2017 | O'Connor | A01B 79/005 |
| 2017/0351933 A1 * | 12/2017 | Bleiweiss | G06K 9/627 |
| 2018/0035606 A1 * | 2/2018 | Burdoucci | A01D 34/008 |

FOREIGN PATENT DOCUMENTS

| | | |
|---|---|---|
| CN | 103770943 A | 5/2014 |
| CN | 203652111 U | 6/2014 |
| DE | 102010046479 A1 | 3/2012 |
| DE | 102014201203 A1 | 7/2015 |
| JP | H06153754 A | 6/1994 |
| JP | H11299305 A | 11/1999 |
| JP | 2004016160 A | 1/2004 |
| JP | 2015080438 A | 4/2015 |
| JP | 2015531228 A | 11/2015 |
| WO | 2008097080 | 8/2008 |
| WO | 2008098290 A1 | 8/2008 |
| WO | 2010057266 | 5/2010 |
| WO | 2013041636 A1 | 3/2013 |
| WO | 2014058337 A1 | 4/2014 |
| WO | 2014146884 A1 | 9/2014 |
| WO | 2015142166 A1 | 9/2015 |
| WO | 2016123201 A1 | 8/2016 |

OTHER PUBLICATIONS

International Search Report and Written Opinion dated Nov. 9, 2016 in connection with International Application No. PCT/US2016/051673, 19 pages.

Krissa Welshans, "Sky's the Limit for UAVS in Ag—Feedstuffs Foodlink," published on Mar. 27, 2015; URL: http://feedstuffsfoodlink.com.story-skys-limit-uavs-ag-0-125732-printverion; retrieved on Dec. 5, 2016.

International Search Report & Written Opinion dated Sep. 27, 2016 in connection with International Application PCT/IS2016/041705, 10 pgs.

"PrecisionHawk Turns Applications into Data:Livestock Management PrecisionHawk,"; precisonhawk.com, Jul. 15, 2014, XP0555314971, URL; http://media.precisionhawk.com/topic/turn-applications-into-data-livestock-managament; retrieved on Oct. 28, 2016.

International Search Report & Written Opinion dated Nov. 25, 2016 in connection with International Application PCT/US2016/051584, 14 pgs.

"Unmanned Aerial Vehicles, Farming and Cattle", Penn State Extension, published on Feb. 24, 2015; URL:http://extension.psu.edu/animals/dairy/news/2015/unmanned-aerial-vehicles-farming-and-cattle; retrieved on Dec. 5, 2016.

Les Jsperson, "Flying Drone Around the Feedlot," Published on Dec. 27, 2014; URL://www.youtube.com/watch?v=K122WAURDY; retrieved on Oct. 31, 2016.

U.S. Appl. No. 14/860,072, filed Sep. 21, 2015.

U.S. Appl. No. 14/859,974, filed Sep. 21, 2015.

"eBee Ag—The Precision Agriculture Drone," retrieved on May 27, 2015 from http://www.sensefly.com/drones/ebee-ag.html, 7 pgs.

"Drones for Agricultural Crop Surveillance," Precision Drone, Agriculture, retrieved on May 20, 2015 from http://www.precisiondrone.com/agriculture/, 3 pgs.

"The Drones for Precision Agriculture," Brochure, eBee senseFly, senseFly Ltd., 2014, 7 pgs.

"Drones for Agriculture," SenseFly Ltd., retrieved on May 20, 2015 from https://www.sensefly.com/applications/agriculture.html, 5 pgs.

Postflight Terra 3D Professional photogrammetry software, Feature List, Version 3.4, Release Date: Apr. 8, 2015, 2 pgs.

Notice of Allowance dated Jul. 10, 2018, in connection with Japanese Patent Application No. 2018-501857, 3 pgs. An English translation of this document, or portion thereof, is not within the possession, custody, or control of, or is not readily available to any individual designated in § 1.56(c).

* cited by examiner

AGRICULTURAL CROP ANALYSIS DRONE

This application is a divisional of U.S. patent application Ser. No. 14/802,389 filed on Jul. 17, 2015, which is incorporated herein by reference in its entirety.

TECHNICAL FIELD

The present invention relates generally to agricultural farming, and, more particularly, to an agricultural drone for use in combination with agricultural equipment.

BACKGROUND OF THE INVENTION

Modern farming continues to make significant strides in the industry's ability to produce larger and more robust foods in response to demand and increasing populations. For example, advances in chemical engineering, fertilization, irrigation, soil analysis and equipment (hardware and software) have revolutionized crop production and associated systems. In this evolution of farming techniques, modern farming has increasingly turned to technological advances in the full stream of farming such as planting, tending and harvesting of crops which requires a wide range of tools, equipment, machinery, chemicals and other materials.

For example, vehicle mounted spraying systems incorporating a boom that extends laterally on both sides of a vehicle such as a tractor are commonly used to spray agricultural crops with liquid based products such as fertilizers or other chemicals. Typically, these types of spraying systems are mounted to the rear of the vehicle which will also carry a tank containing the liquid that is to be sprayed. To ensure that the correct amount of liquid is sprayed, the spraying system is configured so that a given flow rate is dispensed from a plurality of sprayers located along the arm at a predetermined height above the surface to be sprayed. Often these vehicle mounted spraying systems will incorporate a height adjustment capability to allow the overall height of the boom to be adjusted as desired. Booms vary in size, with typical wing tip to wing tip lengths of 90 feet, 120 feet and 150 feet.

Such spraying systems prove very adequate over flat terrain, however, where the surface to be sprayed is undulating or sloped simple height adjustment of the boom relative to the vehicle is not sufficient as the ground to the right of the vehicle may be elevated with respect the ground surface to the left of the vehicle. To overcome this problem, the boom is commonly divided into separate articulated arms or wings each of which are independently adjustable by hydraulic rams which function to raise or lower the booms in accordance with a control signal provided by ultrasonic distance sensors located on each wing. These distance sensors measure the distance between the wing and the ground surface. In this manner, either the left or right wing of the boom may be automatically raised or lowered as required.

However, there are a number of disadvantages with this approach. As the wings extend for relatively large distances from the vehicle, the wings are mounted to a central rigid support structure which itself is resiliently mounted to the vehicle. This resilient mounting includes a combination of springs, shock absorbers and pendulums so as to absorb severe twisting and movement shocks and provide some mechanical self levelling of the boom. This mounting also provides approximately ±10° of travel in the roll direction which functions to absorb the significant stresses that the central support structure would otherwise encounter if it were to be rigidly mounted to the vehicle.

Unfortunately, the effect of this resilient mounting is to greatly reduce the stability of the wing height control as, for example, raising the left wing to compensate for a raised ground profile in this region will in fact cause the right wing to pivot upwardly due to the torque imparted on the entire boom by the redistribution of weight on the left hand side. This will then result in a control signal being sent to the right hand side to lower the right wing, thereby leading to a potential instability. Eventually, the boom will reach equilibrium but only after a delay of approximately one to three seconds during which time the sprayed liquid will not be dispensed in the correct amounts over the ground.

Another significant disadvantage of existing vehicle mounted spray systems occurs when the vehicle encounters a local undulation in the surface such as a rock or a rut in the ground that causes the vehicle to rapidly change lateral slope angle. In extreme circumstances, this could cause the tip of a wing to impact the ground as the speed of response of the ultrasonic distance sensors located on the wings is not rapid enough to prevent this from occurring. Even in the case where an impact is avoided, the raising of the wing to avoid the impact will cause the raising of the opposed wing as discussed earlier, once again resulting in a certain instability of the spraying system.

As highlighted above, the terrain over which such sprayers systems operate can heavily impact the overall stability of the sprayer and the performance of the sprayer in terms of dispensing the specific liquid (e.g., fertilizer) at the desired rate and coverage area. In the field of precision agriculture, agricultural drones and/or so-called unmanned aerial vehicles (UAV) exist that are used to study terrains and have been used to capture highly accurate images of fields and crops that cover hundreds of hectares/acres in a single flight. Such image data is combined with available post-flight data/image processing software to transform the captured images into, for example, one or more orthomosaic images and/or digital elevation models, generate custom vegetation indices to detect structural, chlorophyll and water stresses and/or evaluate irrigation management. For example, the images and other information collected by such agricultural drones can be analyzed on a post-flight basis using available image processing and data processing software that will provide normalized differential vegetation index (NDVI) maps, 2D index maps, 2D geo-referenced orthomosaics, 3D textured mesh, 3D digital surface models (DSM), contour lines, application maps, thermal field maps, reflectance maps and other crop monitoring/analysis. For example, a post-flight reflectance map (in a well-known shapefile (SHP) format) of selected crops can be imported into available farm management software for further diagnosis and/or imported directly into a tractor console. However, such analysis is on a post-flight basis.

Therefore, a need exists for an improved technique that utilizes agricultural drones to improve the use, control and effectiveness of agricultural boom sprayers in real-time.

BRIEF SUMMARY OF THE EMBODIMENTS

In accordance with various embodiments, one or more agricultural drones are used in combination with agricultural equipment, e.g., an agricultural boom sprayer, to improve the real-time delivery and dispensing of liquid from the sprayer including monitoring and verifying that the liquid is being dispensed correctly and/or in accordance with a desired distribution pattern or level.

More particularly, in accordance with an embodiment, one or more agricultural drones are dispatched to fly in advance of (i.e., in front of) and in proximity to an agricultural boom sprayer with the agricultural drone collecting real-time topology, elevation and other information (collectively referred to herein as "crop analysis information") with respect to the crops and/or terrain being sprayed. Such crop analysis information may include multispectral and/or hyperspectral pictures. In accordance with the embodiment, the flying of the drone and the traversing of the crops by the agricultural boom sprayer occur substantially contemporaneously. In turn, the agricultural drone communicates such crop analysis information to the agricultural sprayer operating behind the in-flight agricultural drone so that the sprayer can utilize the real-time crop analysis information to operate the sprayer. The real-time analysis can be performed directly by the drone and communicated to the sprayer for action, or the underlying data can be transmitted from the drone to the sprayer console for completion of the data manipulation and analysis. For example, the crop analysis information can be used to stabilize the sprayer (e.g., in the event that RGG pictures of transformed into 3D maps of the canopy geometry defined by the plurality of crops) or level the boom sprayer in order to improve dispensing of the liquid being applied at that time.

In accordance with a further embodiment, one or more agricultural drones are dispatched to fly in back of and in proximity to an agricultural boom sprayer with the drone collecting real-time dispensing information (collectively referred to herein as "dispensing information") with respect to performance and effectiveness of the liquid being dispensed by the boom sprayer. In accordance with this embodiment, the flying of the agricultural drone and the traversing of the crops by the agricultural boom sprayer occur substantially contemporaneously. In turn, the agricultural drone communicates such crop analysis information to the agricultural sprayer operating ahead of the in-flight agricultural drone so that the sprayer can utilize the dispensing information to make appropriate adjustments to improve the overall sprayer performance. For example, the dispensing information can be used to measure the real-time level of liquid being applied to a section of crops and whether the liquid is actually being dispensed at the desired rate or level.

These and other advantages of the embodiments will be apparent to those of ordinary skill in the art by reference to the following detailed description and the accompanying drawings.

DETAILED DESCRIPTION

In accordance with various embodiments, one or more agricultural drones are used in combination with an agricultural boom sprayer to improve the real-time delivery and dispensing of liquid from the sprayer including monitoring and verifying that the liquid is being dispensed correctly and/or in accordance with a desired distribution pattern or level.

Figure 1:
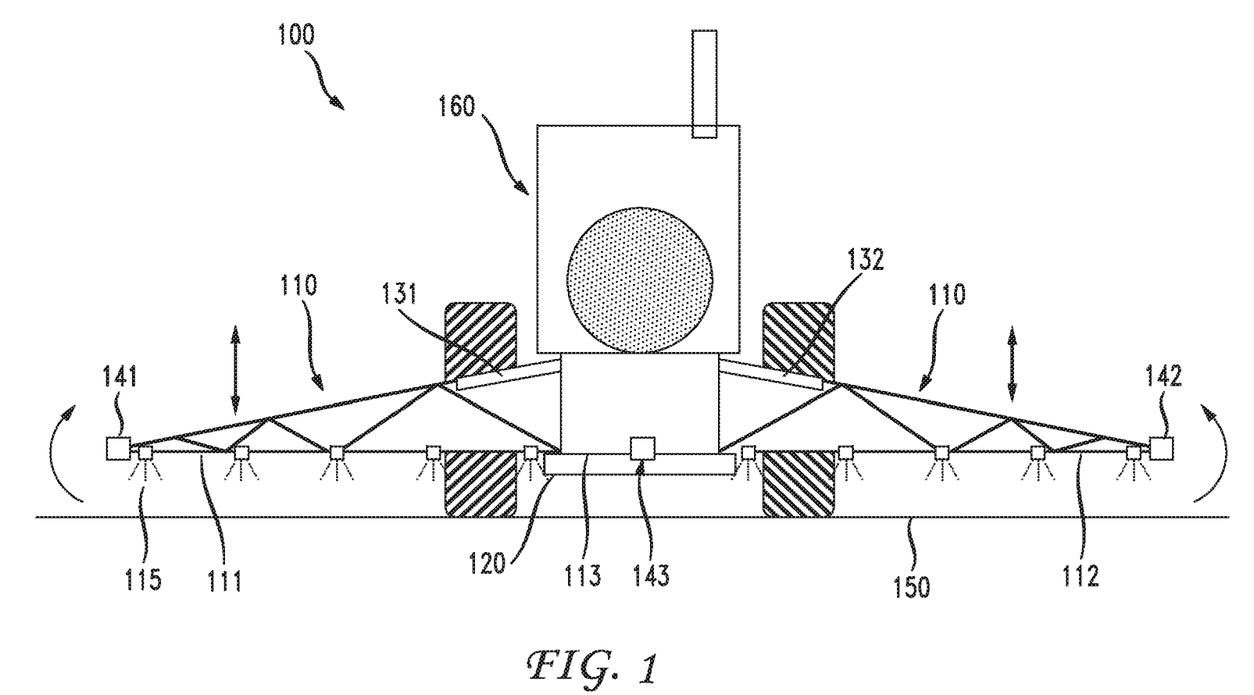
FIG. 1 shows a rear elevation view of an illustrative agricultural boom sprayer in accordance with an illustrative embodiment.

FIG. 1 shows a rear elevation view of an illustrative agricultural sprayer 100 in accordance with an illustrative embodiment of the present invention. Agricultural boom sprayer 100 comprises a vehicle 160 which in this case is a tractor and includes a boom section 110 incorporating a pair of opposed wing sections 111 and 112 mounted to a central support structure 113 which in turn is mounted to vehicle 160 by a resilient mounting arrangement 120 as is well-known. The boom section 110 includes a raising means (not shown), which allows the entire boom 110 to be raised to a predetermined height with respect to the tractor 160 while ensuring that spray nozzles 115 continue to point in a downward direction. The raising means utilizes hydraulic rams and may be via, illustratively, a parallelogram mechanical method where the central support structure 113 is raised by a series of parallel linkage arms (not shown) extending rearward and downwardly from the resilient mounting arrangement 120 in a well-known fashion.

Each wing 111 and 112 may be separately articulated by a corresponding hydraulic ram 131 and 132 which function to separately raise and lower each wing 111 and 112 in accordance with control signals provided by a hydraulic control system (not shown). Distance sensors 141 and 142 are mounted at the tips of each wing 111 and 112 and measure the positions or heights of the tips of each wing 111 and 112. Alternatively one or more distance sensors may be mounted at other locations along a wing to provide position or height information at their respective position. Distance sensor 143 is also mounted on the support structure 113. These sensors allow the difference in the height of the wing tip relative to the center of the support structure to be calculated (i.e. the wing height error). The principles embodied by the various embodiments herein apply equally to various agricultural sprayer and boom sprayer configurations as such the illustrative configuration of FIG. 1 is one of many such configurations in which the principles and advantages of the disclosed embodiments apply.

Figure 2:
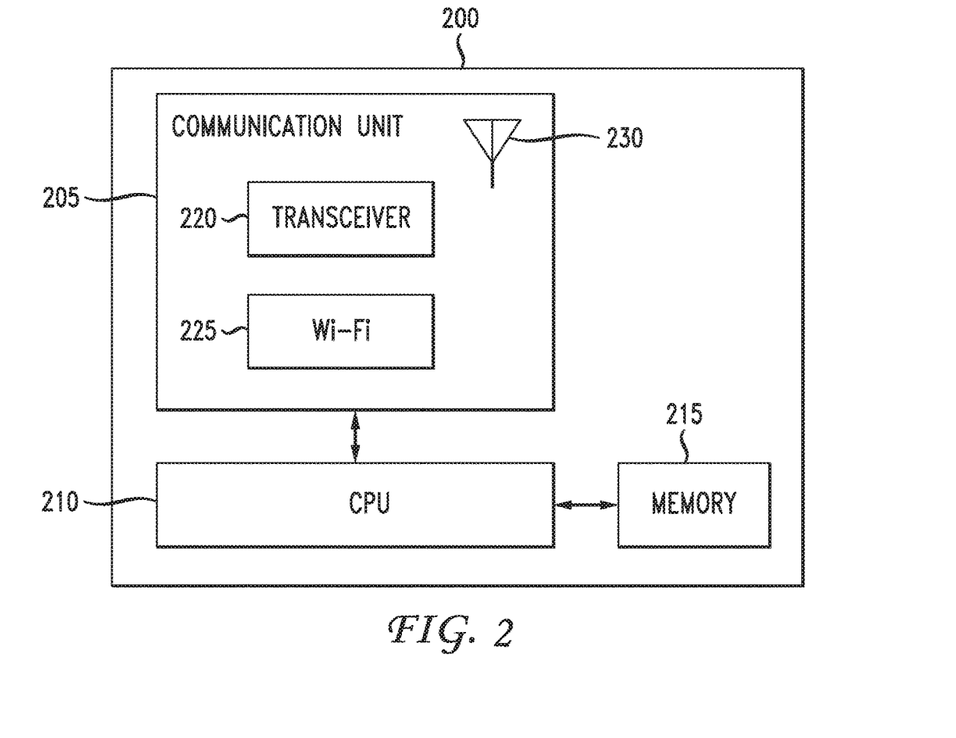
FIG. 2 shows a high-level block diagram of a crop analysis unit which is integral with the agricultural boom sprayer of FIG. 1 in accordance with an embodiment.

In accordance with an embodiment, agricultural boom sprayer 100 is configured with crop analysis unit 200 as shown in FIG. 2. Crop analysis unit 200 includes communication unit 205 having transceiver 220, Wi-Fi controller 225 and antenna 230, central processing unit 210, and memory 215. As detailed further herein below, crop analysis unit 200, being integral with agricultural boom sprayer 100, will facilitate real-time communications between agricultural boom sprayer 100 and one or more agricultural drones flying in proximity thereto in order to improve the delivery and dispensing of liquid from such sprayers including monitoring and verifying that the liquid is being dispensed correctly.

Figure 3:
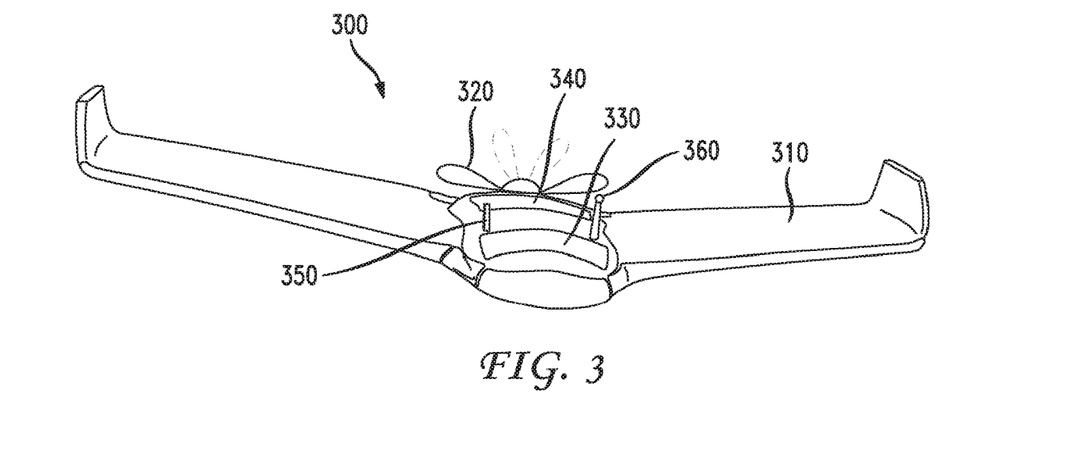
FIG. 3 shows an illustrative agricultural drone in accordance with an embodiment.

In particular, FIG. 3 shows an illustrative agricultural drone 300 in accordance with an embodiment. As shown, agricultural drone 300 includes a lightweight body and wings 310, motor assembly 320, built-in GNSS/RTK/PPP receiver 330, built-in camera 340, pilot tube 350 and antenna 360. Of course, agricultural drone 300 will include other components and functionality not depicted in FIG. 3 such as batteries, ground sensors, onboard electronics and communications, onboard artificial intelligence, collision avoidance, to name a few. One such commercially available agricultural drone is the eBee Ag drone sold by senseFly Ltd, Route de Geneve 38, 033 Cheseaux-Lausanne, Switzerland. Agricultural drone 300 is fully autonomous and will fly in accordance with a predefined flight plan and in the case of agricultural applications the drone will capture highly accurate images of a particular field or fields (having a single crop or a plurality of crops) covering hundreds of hectares/acres in a single flight.

Figure 4:
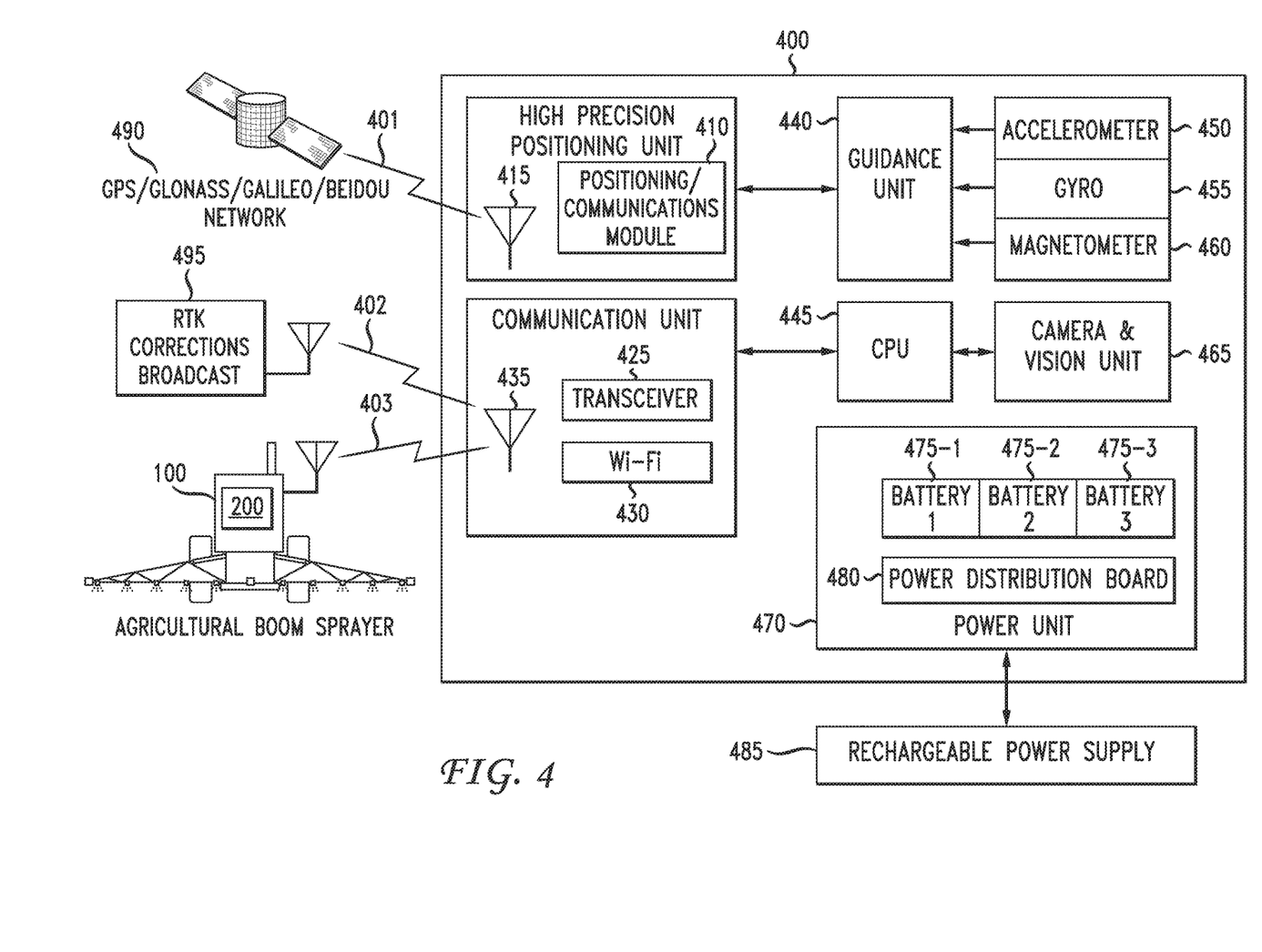
FIG. 4 shows a high-level block diagram of on-board electronics which is integral with the agricultural boom drone of FIG. 3 in accordance with an embodiment.

FIG. 4 shows a high-level block diagram of on-board electronics 400 which are integral with agricultural drone 300 of FIG. 3 in accordance with an embodiment. As shown, on-board electronics 400 includes high precision positioning unit 405 having positioning/communications module 410 (e.g., a GPS/GLONOSS/GALILEO/BEIDOU positioning/communications module) and antenna 415 which communicates, via communications link 401, with GPS/GLONOSS/GALILEO/BEIDOU network 490 in a well-known fashion, communication unit 420 having transceiver 425, Wi-Fi module 430 and antenna 435 which interfaces with at least RTK corrections broadcast 495 over communications link 402 in a well-known fashion, guidance unit 440, central processing unit (CPU) 445, accelerometer 450, gyro 455, magnetometer 460, camera and vision unit 465, power unit 470 having batteries 475-1 through 475-3 and power distribution board 480 which interfaces with rechargeable power supply 485 in a well-known fashion. In accordance with the embodiment, agricultural drone 300 will transmit and communicate real-time communications and information to agricultural boom sprayer 100 as configured with crop analysis unit 200 (as shown illustratively in FIG. 4), via communication link 403, utilizing communications unit 420 with respect to a particular field and/or crops under investigation by agricultural drone 300.

Figure 5:
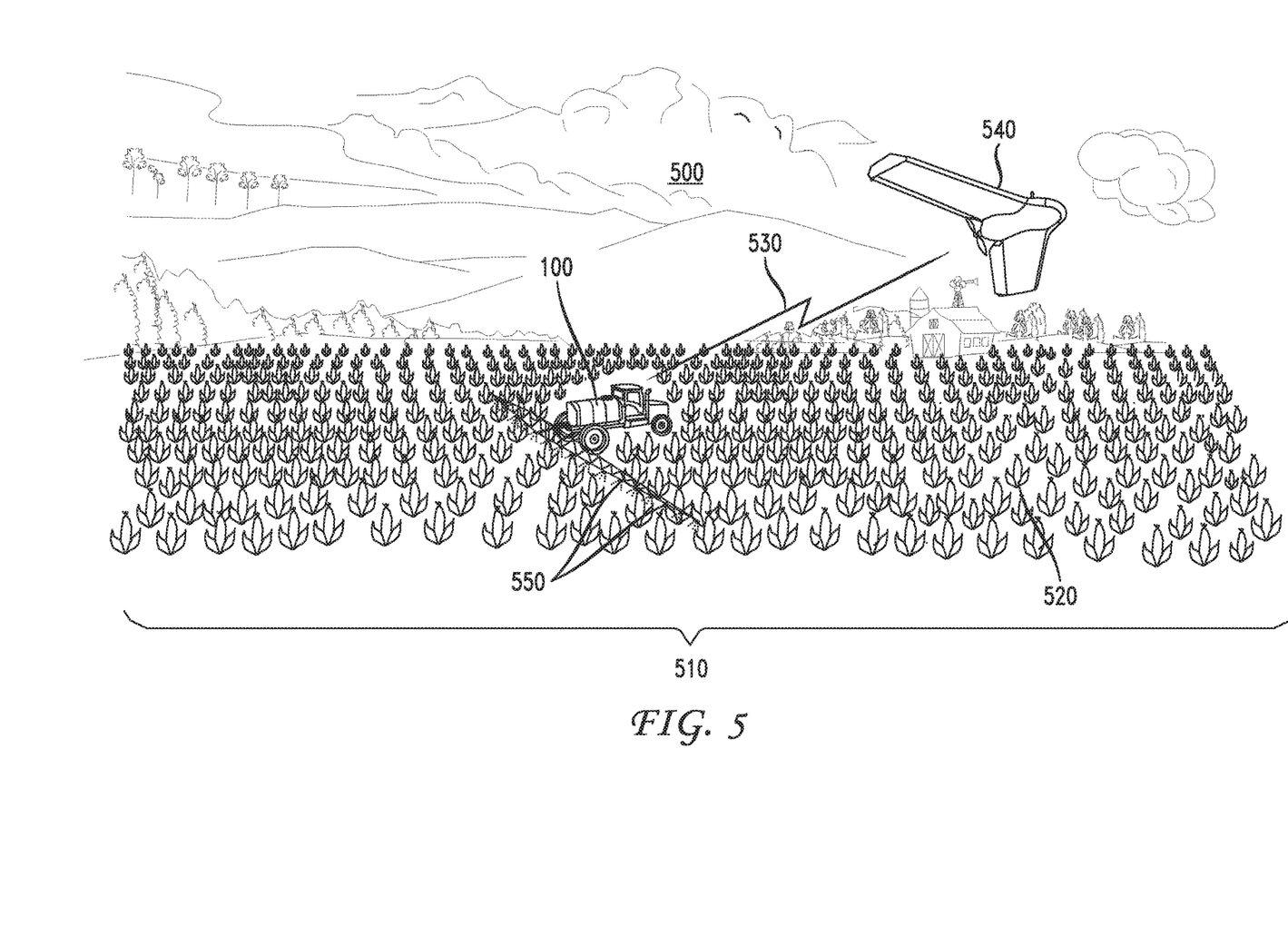
FIG. 5 shows an explanatory diagram of the use, in accordance with an embodiment, of the agricultural boom sprayer configured in accordance with FIG. 1 and FIG. 2 in combination with an agricultural drone configured in accordance with FIG. 3 and FIG. 4.

For example, FIG. 5 shows an explanatory diagram 500 of an embodiment utilizing agricultural boom sprayer 100 configured in accordance with FIG. 1 and FIG. 2 (as shown illustratively in FIG. 4) in combination with agricultural drone 500 which is configured the same as agricultural drone 300 in accordance with FIG. 3 and FIG. 4. As shown, agricultural drone 540 is flying over field 510 having a plurality of crops 520. It will be understand that the plurality of crops may be any kind (one or many) of crop, vegetable, grain or vegetation or other plant grown on typical agricultural farms. This flyover by agricultural drone 540 will be in accordance with a defined flight plan in a well-known manner during which agricultural drone 540 will be collecting real-time information with respect to field 510 and/or plurality of crops 520. In this embodiment, agricultural drone 540 is flying and maintaining a position in front of agricultural boom sprayer 100. In accordance with this embodiment, the flying of agricultural drone 540 and the traversing of the crops by agricultural boom sprayer 100 occur substantially contemporaneously. Such real-time information will include elevation data, contour data, topology data crop data and/or crop analysis which can be utilized, in accordance with an embodiment, to provide real-time communications, over communications link 530, to agricultural boom sprayer 100 that will assist in improving the performance of agricultural boom sprayer 100. As will be noted throughout the discussion herein, the terms "front" and "back" are utilized to denote different positions of the agricultural drone relative to the agricultural boom sprayer. That is, "front" may designate a position in advance of the agricultural boom sprayer as the vehicle traverses the field in a forward position (e.g., from an easterly position to a westerly position on the field) and the term "back" may designate a position behind the agricultural sprayer as the vehicle traverses the field. As such, if the agricultural boom sprayer reverses its position (e.g., now traversing the field from west to east) it will be understood that a "front" position can then become a "back" position, and vice versa. The point being that such terms are used to designate different positions of the agricultural drone(s) flying relative to the agricultural boom sprayers as they fly and traverse, as the case may be, a particular field(s) and/or crop(s).

For example, referring back to FIG. 1, typically distance sensors 141, 142 and 143 employ ultrasonic ranging to measure the height of the sensor above the surface (e.g., field 510) being sprayed. For example, ultrasonic sensors in the MA40 series produced by the Murata Manufacturing Company may be used. As shown in FIG. 1, ultrasonic distance sensors are placed near each wing tip for wing height measurements, and on the support structure 113 for measurements of the reference height. Alternatively, two or more distance sensors may be mounted on support structure 113 to increase the reliability of the reference height measurement. Typically, multiple distance sensors can be located on a wing and these can also be averaged or otherwise combined to improve the estimate of the respective wing height and ultimately assist in leveling agricultural sprayer 100 as it traverses over field 510. However, in such typical sensor arrangements, the number of points utilized for such leveling estimations is limited by the number of sensors made available on boom section 110 of agricultural sprayer 100.

Advantageously, in accordance with an embodiment, the real-time information collected by agricultural drone 540 such as elevation data, contour data, topology data, crop data and/or crop analysis will be utilized and communicated, over communications link 530, to agricultural sprayer 100 to assist with stabilizing and leveling boom section 110 as agricultural boom sprayer 100 traverses over field 510 dispensing liquid 550 (e.g., fertilizer or pesticide) over plurality of crops 510. Communications link 530 is, illustratively, a wireless communications link established over wireless infrastructure, such as a third party supplied cellular or Wi-Fi network, but in many cases where an existing third party wireless infrastructure does not exist, the user must provide a suitable replacement. In such cases, one type of a user supplied infrastructure configuration is a narrowband single frequency radio system that may be operated over field 510, for example. Such communication is realized with, for example, Wi-Fi radios as well as cellular phones (e.g., 3G/4G/LTE/5G), UHF radios and/or solid state radios.

As such, distance sensors 141,142 and 143 are no longer the primary means for leveling boom section 110 and can be used as a secondary means of leveling. In alternative embodiments, agricultural sprayer 100 can be constructed without such sensors if no secondary leveling means is desired or to save cost or space. Leveling algorithms will take into consideration the geometry of the boom leveling system and its distribution of actuators and dampers, for example, and the control system will receive as input data transmitted by the drone during its in-flight operations over the field and crops.

As such, the real-time information exchanged between agricultural drone 540 and agricultural boom sprayer 100 allows for increased stability and leveling precision of boom section 100 in that the type of and precision of the delivered real-time information far exceeds that of traditional leveling techniques of boom sprayers. Further, given that the conditions associated with field 510 and the plurality of crops 520 can change rapidly due to a variety of adverse conditions (e.g., wind, rain, heat, animals, etc.), the application of agricultural drone 540 in real-time with agricultural boom sprayer 100 allows for the mitigation of such adverse conditions and their overall impact on the spraying of the plurality of crops 520.

Figure 6:
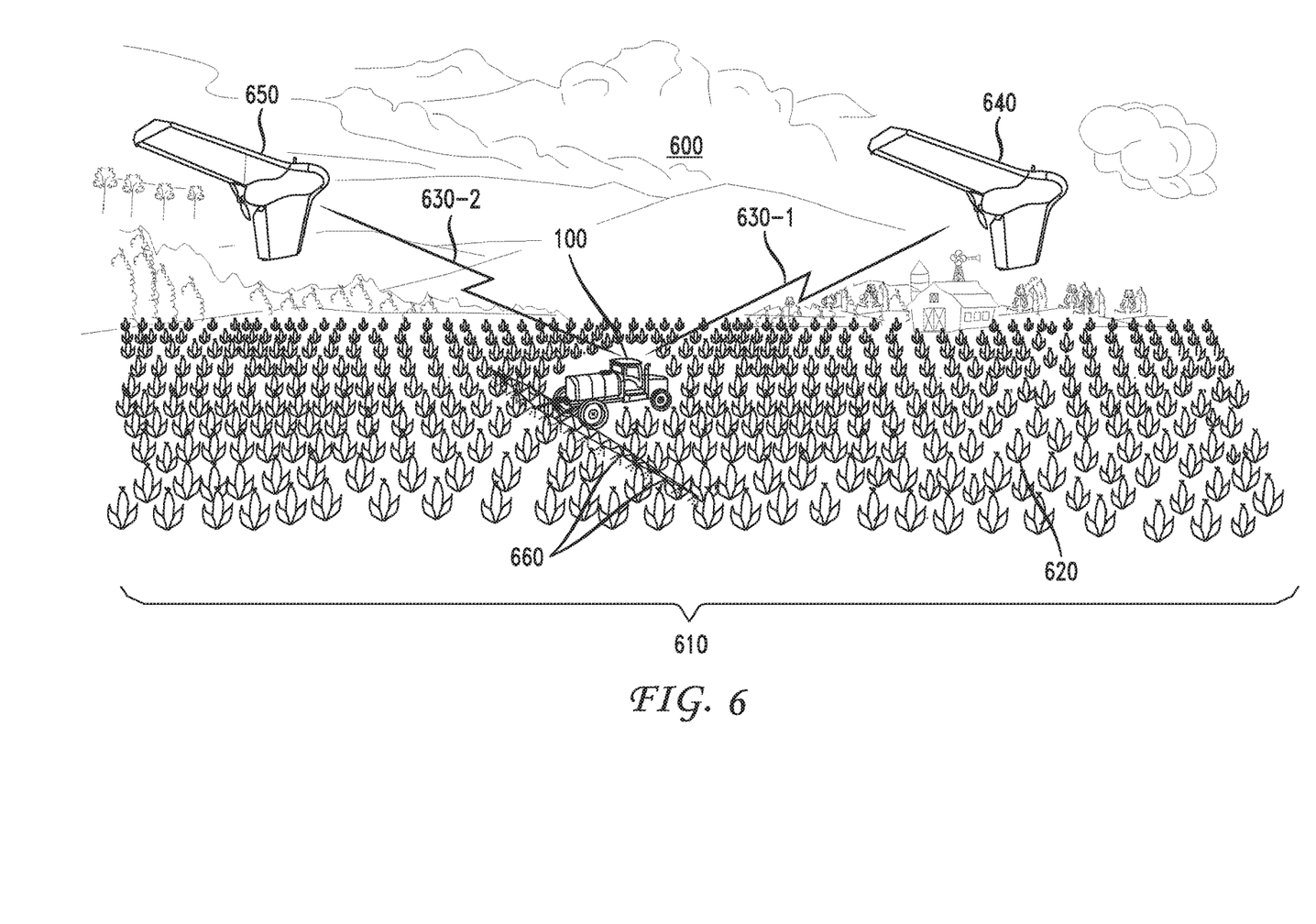
FIG. 6 shows an explanatory diagram of the use, in accordance with an embodiment, of the agricultural boom sprayer configured in accordance with FIG. 1 and FIG. 2 in combination with multiple agricultural drones configured in accordance with FIG. 3 and FIG. 4.

To that end, FIG. 6 shows an explanatory diagram 600 of an alternative embodiment utilizing agricultural sprayer 100 again configured in accordance with FIG. 1 and FIG. 2 (as illustratively shown in FIG. 4) in combination with multiple agricultural drones configured in accordance with FIG. 3 and FIG. 4. That is, agricultural drone 640 and agricultural drone 650 are each configured that same as agricultural drone 300 in accordance with FIG. 3 and FIG. 4 and flying over field 610 having a plurality of crops 620. These flyovers by agricultural drone 640 and agricultural drone 650 will be in accordance with a defined flight plans in a well-known manner during which agricultural drone 640 and agricultural drone 650 will each be collecting real-time information with respect to field 610 and plurality of crops 620. In this embodiment, agricultural drone 640 is flying in a position in front of agricultural sprayer 100 and is performing substantially the same functions as detailed above in FIG. 5 with respect to agricultural 500, as such these details will not be repeated here with agricultural drone 640 communicating over communications link 630-1 with agricultural sprayer 100.

In addition, agricultural drone 650 is flying in a position in back of agricultural sprayer 100 and is collecting a variety of additional information for real-time communication, over communications link 630-2, with agricultural sprayer 100. In accordance with this embodiment, the flying of the drone and the traversing of the crops by the agricultural boom sprayer occur substantially contemporaneously. In particular, agricultural drone 650 is collecting additional real-time information directed to the efficiency and verification that liquid 660 (e.g., fertilizer or pesticide) is being dispensed correctly (e.g., at the desired rate or volume). If not, the real-time information communicated back to agricultural sprayer 100 will be utilized by the sprayer to adjust the dispensing of liquid 660 onto plurality of crops 620 to the desired level or rate, for example.

Further, in accordance with an embodiment, agricultural drone 640 (and/or agricultural drone 650) may be used to assist the farmers tending to field 610 to identify individual crops of the plurality of crops 620 which may be suffering or need additional further attention, for example, suffering from drought or under-fertilization. As such, agricultural drone 640 may be programmed (via camera and vision unit 465 as shown in FIG. 4) to capture photographs and/or videos of particular crops and such information can be transmitted (via communications unit 420) to the farmer for analysis. Thereafter, the farmer may communicate further instructions back to agricultural drone 640 for further information collection and/or making specified adjustments to agricultural sprayer 100. The analysis may also provide the farmer with advance warning signs directed to water or drainage conditions specific to a particular section of field 610 and/or identify when harvesting of field 610 should occur and which crops of the plurality of crops 620 are mature enough for harvesting.

Figure 7:
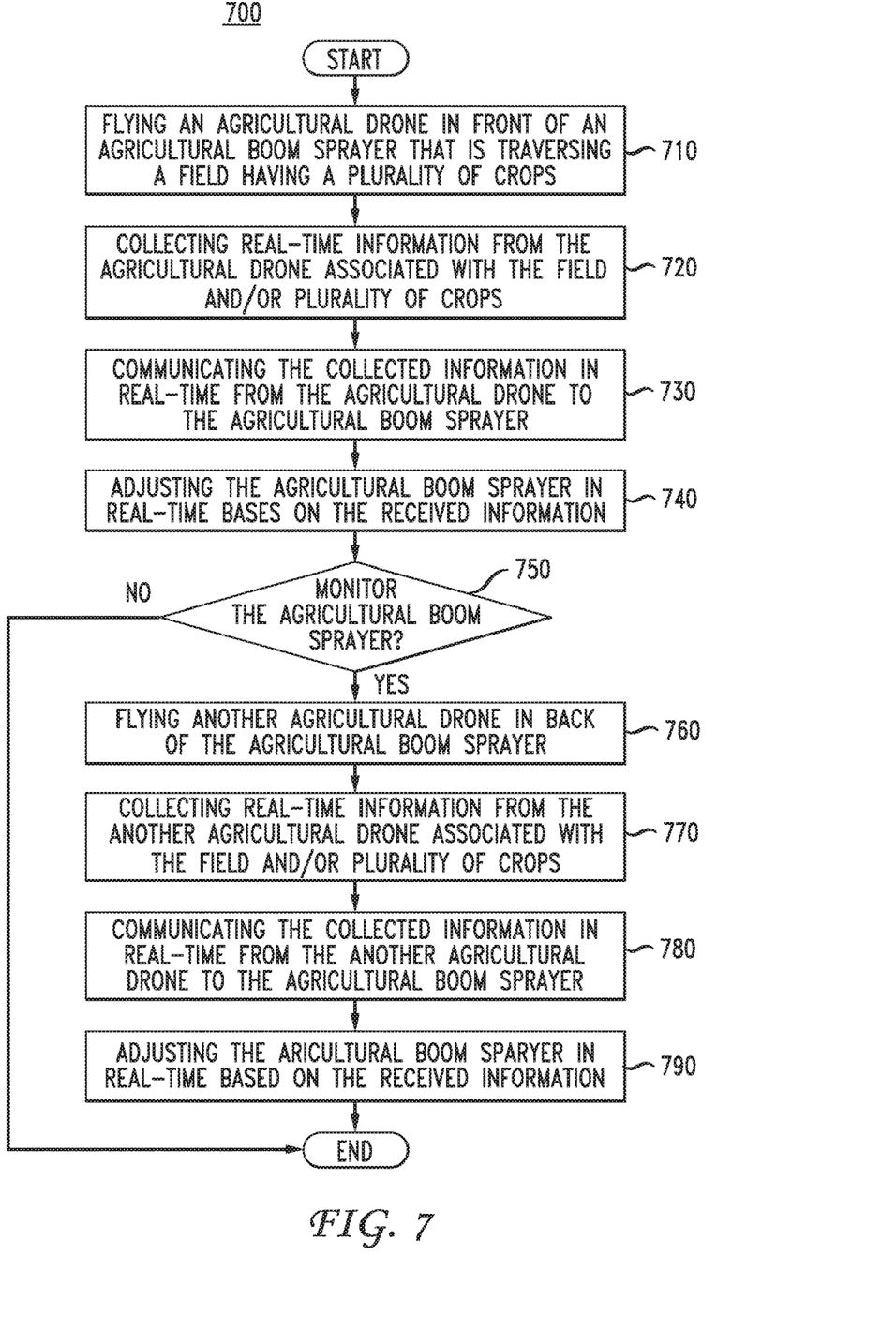
FIG. 7 shows a flowchart of illustrative operations for agricultural farming utilizing an agricultural drone(s) for agricultural crop analysis in accordance with an embodiment.

FIG. 7 shows a flowchart of illustrative operations 700 for agricultural farming utilizing agricultural drone(s) for agricultural crop analysis in accordance with an embodiment. In accordance with the operations of FIG. 7, at step 710, an agricultural drone (i.e., a first agricultural drone) is flown in front of an agricultural boom sprayer that is traversing a field having a plurality of crops and, at step 720, collecting real-time information associated with the field and/or the plurality of crops (e.g., crop analysis, contour, elevation, etc., as detailed herein above) from the first agricultural drone. At step 730, the collected information is transmitted and communicated, in real-time, from the first agricultural drone to the agricultural boom sprayer, as detailed herein above, and, at step 740, the agricultural boom sprayer utilizes the received information for adjustment purposes (e.g., leveling the boom).

Advantageously, the real-time collection, communication and utilization of agricultural specific information, in accordance with the embodiment, is realized and exchanged between the agricultural drone and agricultural boom sprayer for use in the immediate control of and adaption by the agricultural boom sprayer, as detailed herein above. In addition to the above-described steps, there is also an option of monitoring, at step 750, the agricultural boom sprayer during operation. If such monitoring is desired, another agricultural drone (i.e., a second agricultural drone) is flown, at step 760, in back of the agricultural boom sprayer that is traversing the field having the plurality of crops and, at step 770, collecting real-time information associated with the field and/or the plurality of crops (e.g., crop analysis, fertilizer coverage, dispensed liquid levels, as detailed herein above) from the second agricultural drone. In accordance with this embodiment, the flying of the drones and the traversing of the crops by the agricultural boom sprayer occur substantially contemporaneously. At step 780, the collected information is transmitted and communicated, in real-time, from the second agricultural drone to the agricultural boom sprayer, as detailed herein above, and, at step 790, the agricultural boom sprayer utilized the received information for adjustment purposes (e.g., correcting the dispense rate of the liquid).

Figure 8:
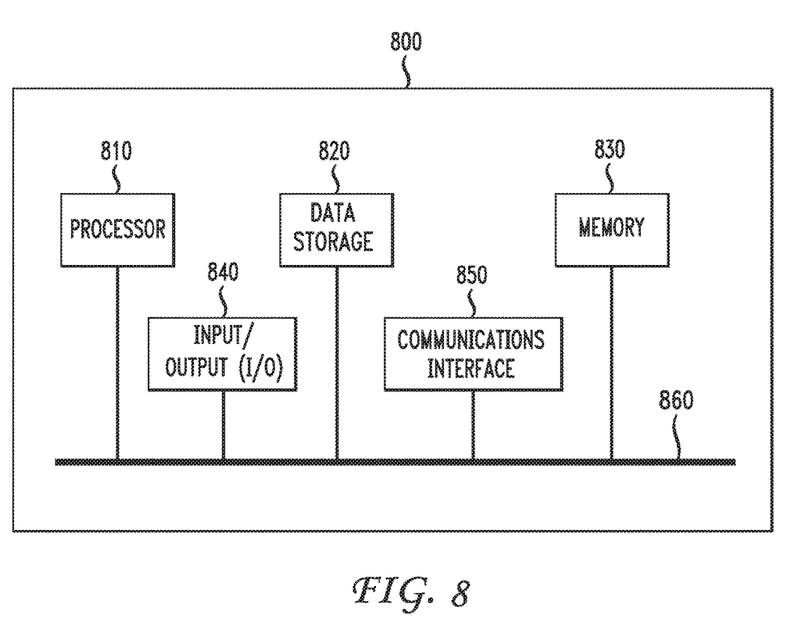
FIG. 8 is a high-level block diagram of an alternative exemplary crop analysis unit in accordance with an embodiment.

As detailed above, the various embodiments herein can be embodied in the form of methods and apparatuses for practicing those methods. The disclosed methods may be performed by a combination of hardware, software, firmware, middleware, and computer-readable medium (collectively "communications device") installed in and/or communicatively connected to a processor or the like. FIG. 8 is a high-level block diagram of crop analysis unit 800 which is an alternative configuration of exemplary crop analysis unit 200 (as shown in FIG. 2) that may be used for enabling agricultural drone(s) for agricultural crop analysis in accordance with the various embodiments herein.

Crop analysis unit 800 comprises a processor 810 operatively coupled to a data storage device 820 and a memory 830. Processor 810 controls the overall operation of crop analysis unit 800 by executing computer program instructions that define such operations. Communications bus 860 facilitates the coupling and communication between the various components of crop analysis unit 800. The computer program instructions may be stored in data storage device 820, or a non-transitory computer readable medium, and loaded into memory 830 when execution of the computer program instructions is desired.

Thus, certain of the steps of the disclosed method (see, e.g., FIG. 7) and the associated discussion herein above can be defined by the computer program instructions stored in memory 830 and/or data storage device 820 and controlled by processor 810 executing the computer program instructions. For example, the computer program instructions can be implemented as computer executable code programmed by one skilled in the art to perform the illustrative operations defined by the disclosed method. Accordingly, by executing the computer program instructions, processor 810 executes an algorithm defined by the disclosed method. Crop analysis unit 800 also includes one or more communications interface 850 for communicating with other devices via a network (e.g., a wireless communications network) or communications protocol (e.g., Bluetooth®). For example, such communication interfaces may be a receiver, transceiver or modem for exchanging wired or wireless communications in any number of well-known fashions. Crop analysis unit 400 also includes one or more input/output devices 840 that enable user interaction with crop analysis unit 800 (e.g., camera, display, keyboard, mouse, speakers, microphone, buttons, etc.).

Processor 810 may include both general and special purpose microprocessors, and may be the sole processor or one of multiple processors of crop analysis unit 800. Processor 810 may comprise one or more central processing units (CPUs), for example. Processor 810, data storage device 820, and/or memory 830 may include, be supplemented by, or incorporated in, one or more application-specific integrated circuits (ASICs) and/or one or more field programmable gate arrays (FPGAs).

Data storage device 820 and memory 830 each comprise a tangible non-transitory computer readable storage medium. Data storage device 820, and memory 830, may each include high-speed random access memory, such as dynamic random access memory (DRAM), static random access memory (SRAM), double data rate synchronous dynamic random access memory (DDR RAM), or other random access solid state memory devices, and may include non-volatile memory, such as one or more magnetic disk storage devices such as internal hard disks and removable disks, magneto-optical disk storage devices, optical disk storage devices, flash memory devices, semiconductor memory devices, such as erasable programmable read-only memory (EPROM), electrically erasable programmable read-only memory (EEPROM), compact disc read-only memory (CD-ROM), digital versatile disc read-only memory (DVD-ROM) disks, or other non-volatile solid state storage devices.

Input/output devices 840 may include peripherals, such as a camera, printer, scanner, display screen, etc. For example, input/output devices 840 may include a display device such as a cathode ray tube (CRT), plasma or liquid crystal display (LCD) monitor for displaying information to the user, a keyboard, and a pointing device such as a mouse or a trackball by which the user can provide input to crop analysis unit 800.

It should be noted that for clarity of explanation, the illustrative embodiments described herein may be presented as comprising individual functional blocks or combinations of functional blocks. The functions these blocks represent may be provided through the use of either dedicated or shared hardware, including, but not limited to, hardware capable of executing software. Illustrative embodiments may comprise digital signal processor ("DSP") hardware and/or software performing the operation described herein. Thus, for example, it will be appreciated by those skilled in the art that the block diagrams herein represent conceptual views of illustrative functions, operations and/or circuitry of the principles described in the various embodiments herein. Similarly, it will be appreciated that any flowcharts, flow diagrams, state transition diagrams, pseudo code, program code and the like represent various processes which may be substantially represented in computer readable medium and so executed by a computer, machine or processor, whether or not such computer, machine or processor is explicitly shown. One skilled in the art will recognize that an implementation of an actual computer or computer system may have other structures and may contain other components as well, and that a high level representation of some of the components of such a computer is for illustrative purposes.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A system for agricultural farming, the system comprising:
   a first agricultural drone flying over a field having a plurality of crops in a position in advance of an agricultural vehicle which is traversing the plurality of crops, collecting information specific to the plurality of crops, and transmitting the collected information in real-time from the first agricultural drone to the agricultural vehicle;
   wherein the agricultural vehicle is a boom sprayer which receives the collected information from the first agricultural done in real-time and adjusts at least one operation of the boom sprayer using the received collected information from the first agricultural drone such that the adjustment of the at least one operation includes a leveling of the boom sprayer achieved independent of any information collected by one or more sensors resident on the boom sprayer.

2. The system of claim 1 wherein the collected information is transmitted over a cellular network.

3. The system of claim 2 wherein the first agricultural drone analyzes the collected information to identify individual crops of the plurality of crops suffering from drought or under-fertilization.

4. The system of claim 3 wherein the flying of the first agricultural drone is in accordance with a defined flight plan.

5. The system of claim 2 wherein the collected information includes image data of at least one of an elevation of the field, a contour of the field, a topology of the field, and a plurality of crops.

6. The system of claim 1 wherein the flying of the first agricultural drone and the traversing of the plurality of crops by the agricultural vehicle are occurring contemporaneously.

7. The system of claim 6 further comprising:
   a second agricultural drone flying over the field having the plurality of crops, collecting information specific to the plurality of crops, and transmitting the collected information in real-time from the second agricultural drone to the agricultural vehicle.

8. The system of claim 7 wherein the flying of the second agricultural drone is in a position in back of the agricultural vehicle, wherein the flying of the second agricultural drone over the field and the traversing of the plurality of crops by the agricultural vehicle are occurring substantially contemporaneously.

9. The system of claim 8 wherein the agricultural vehicle receives the collected information from the second agricultural done in real-time and adjusting at least one operation of the agricultural vehicle using the received collected information from the second agricultural drone.

10. The system of claim 9 wherein the adjusting by the agricultural vehicle includes an adjustment to a rate of dispensing a liquid from the agricultural vehicle.

11. The system of claim 10 wherein the liquid is one of water, fertilizer and crop protection chemicals.

12. The system of claim 7 wherein the first agricultural drone and the second agricultural drone are configured to communicate with each other.

13. The system of claim 11 wherein the collected information from the second agricultural drone includes a measurement of the liquid being dispensed by the agricultural vehicle.

14. The system of claim 7 wherein the transmitting the collected information by the first agricultural drone and the second agricultural drone is over a narrowband frequency radio system.

15. A method for operating an agricultural drone, the method comprising:
flying the agricultural drone over a plurality of crops in a first position in front of an agricultural vehicle traversing the plurality of crops;
collecting information specific to the plurality of crops from the agricultural drone;
transmitting the collected information in real-time from the agricultural drone to the agricultural vehicle traversing the plurality of crops;
receiving, by the agricultural vehicle, the collected information from the agricultural drone in real-time;
adjusting, in real-time, by the agricultural vehicle at least one operation of the agricultural vehicle using the received collected information from the agricultural drone; and
wherein the agricultural vehicle is a boom sprayer, and the adjusting, in real-time, by the boom sprayer includes a leveling of the boom sprayer achieved independent of any information collected by one or more sensors resident on the boom sprayer.

16. The method of claim 15 further comprising:
analyzing, from the agricultural drone, the collected information to identify individual crops of the plurality of crops suffering from drought or under-fertilization.

17. The method of claim 15, wherein the flying of the agricultural drone and the traversing of plurality of crops by the agricultural vehicle occur substantially contemporaneously.

18. The method of claim 17 wherein the transmitting of the collected information uses a Wi-Fi communication.

19. The method of claim 15 wherein the flying of the agricultural drone includes transitioning between the first position and a second position in back of the agricultural vehicle.

20. The method of claim 15 wherein the collected information includes image data of at least one of an elevation of the field, a contour of the field, a topology of the field, and a plurality of crops.

21. The method of claim 15 wherein the collected information is transmitted over a cellular network.

22. The method of claim 15 wherein the flying of the agriculture drone is in accordance with a defined flight plan.

23. The method of claim 15 wherein the adjusting by the agricultural vehicle includes an adjustment to a rate of dispensing a liquid from the agricultural vehicle.

24. The method of claim 23 wherein the liquid is one of water, fertilizer and crop protection chemicals.

25. The method of claim 23 wherein the collected information from the agricultural drone includes a measurement of the liquid being dispensed by the agricultural vehicle on the plurality of crops.

26. A crop analysis system comprising:
an agricultural drone comprising a first processor, for executing computer program instructions stored in a first memory, which when executed by the first processor, cause the first processor to perform operations comprising:
flying the agricultural drone over a plurality of crops in a position in front of an agricultural vehicle traversing the plurality of crops;
collecting information specific to the plurality of crops from the agricultural drone;
transmitting the collected information in real-time from the agricultural drone to the agricultural vehicle traversing the plurality of crops;
wherein the agricultural vehicle comprises a second processor, for executing computer program instructions stored in a second memory, which when executed by the second processor, cause the second processor to perform operations comprising:
receiving, by the agricultural vehicle, the collected information from the agricultural done in real-time;
adjusting, in real-time, by the agricultural vehicle at least one operation of the agricultural vehicle using the received collected information from the agricultural drone; and
wherein the agricultural vehicle is a boom sprayer, and the adjusting, in real-time, by the boom sprayer includes a leveling of the boom sprayer achieved independent of any information collected by one or more sensors resident on the boom sprayer.

27. The crop analysis system of claim 26 wherein the operations performed by the first processor further comprise:
analyzing, from the agricultural drone, the collected information to identify individual crops of the plurality of crops suffering from drought or under-fertilization.

28. The crop analysis system of claim 27 wherein the flying of the agricultural drone and the traversing of plurality of crops by the agricultural vehicle occur contemporaneously.

29. The crop analysis system of claim 28 wherein the flying of the agricultural drone is in accordance with a defined flight plan.

30. The crop analysis system of claim 27 wherein the collected information includes image data of at least one of an elevation of the field, a contour of the field, a topology of the field, and a plurality of crops.

* * * * *

UNITED STATES PATENT AND TRADEMARK OFFICE
CERTIFICATE OF CORRECTION

| | | |
|---|---|---|
| PATENT NO. | : 10,189,568 B2 | Page 1 of 1 |
| APPLICATION NO. | : 15/658968 | |
| DATED | : January 29, 2019 | |
| INVENTOR(S) | : Raymond M. O'Connor and Ivan Giovanni Di Federico | |

It is certified that error appears in the above-identified patent and that said Letters Patent is hereby corrected as shown below:

In the Claims

In Column 10, at Claim 1, Line 43, the sentence "the first agricultural done in real-time" should read --the first agricultural drone in real-time--;

In Column 11, at Claim 9, Line 12, the sentence "the second agricultural done in real-time" should read --the second agricultural drone in real-time--;

In Column 12, at Claim 20, Lines 2-3, the sentence "at least one of an elevation of the field" should read --at least one of an elevation of a field--;

In Column 12, at Claim 20, Lines 3-4, the sentence "and a plurality of crops" should read --and the plurality of crops--;

In Column 12, at Claim 26, Line 38, the sentence "the agricultural done in real-time" should read --the agricultural drone in real-time--;

In Column 12, at Claim 30, Line 62, the sentence "at least one of an elevation of the field" should read --at least one of an elevation of a field--;

In Column 12, at Claim 30, Line 63, the sentence "and a plurality of crops" should read --and the plurality of crops--.

Signed and Sealed this
Sixteenth Day of July, 2019

Andrei Iancu
*Director of the United States Patent and Trademark Office*